E. N. BREITUNG.
ANTISKIDDING DEVICE FOR VEHICLE WHEELS.
APPLICATION FILED JUNE 3, 1921.
1,391,667.
Patented Sept. 27, 1921.
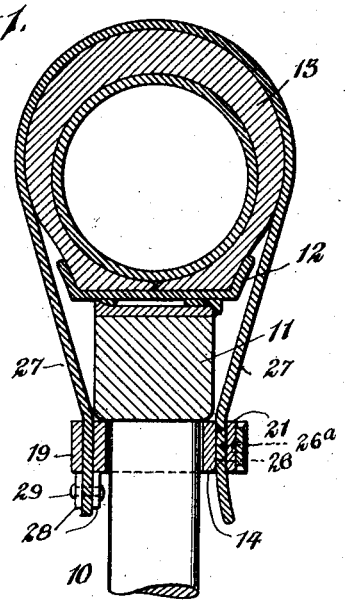
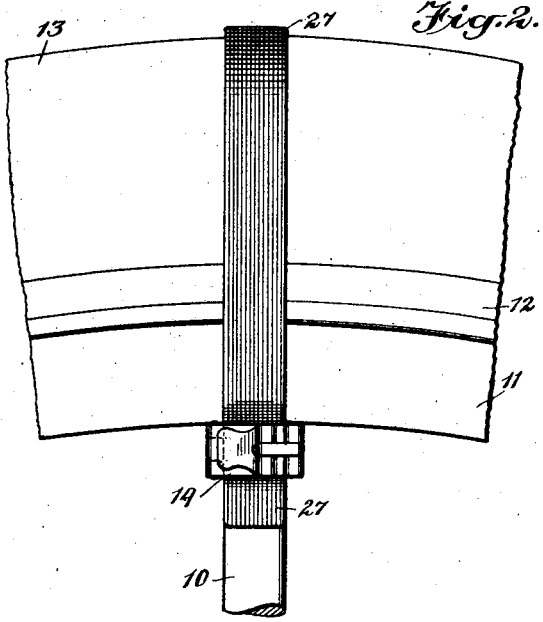
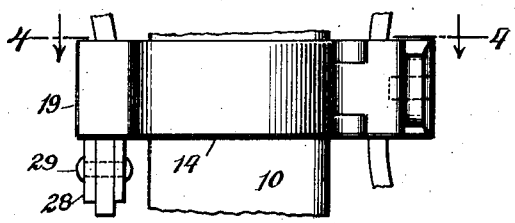
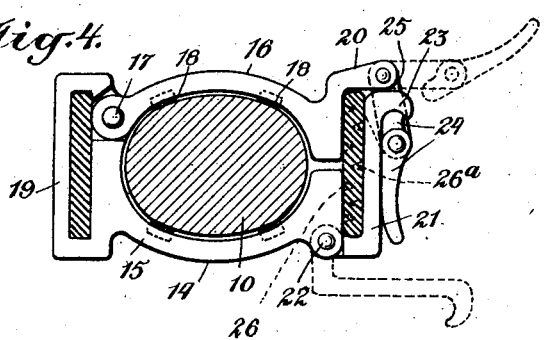
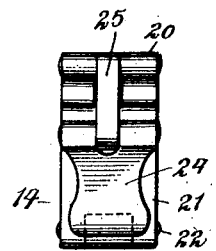
INVENTOR
Edward N. Breitung.
BY
George Cook & Sons
ATTORNEYS

UNITED STATES PATENT OFFICE.

EDWARD N. BREITUNG, OF NEW YORK, N. Y.

ANTISKIDDING DEVICE FOR VEHICLE-WHEELS.

1,391,667.  Specification of Letters Patent.  Patented Sept. 27, 1921.

Application filed June 3, 1921. Serial No. 474,594.

*To all whom it may concern:*

Be it known that I, EDWARD N. BREITUNG, a citizen of the United States, and a resident of New York, borough of Manhattan, in the county of New York and State of New York, have made and invented certain new and useful Improvements in Antiskidding Devices for Vehicle-Wheels, of which the following is a specification.

My invention relates to an anti-skidding device for vehicle wheels, and has for its object to provide a device of this class which may be easily and quickly attached to a vehicle wheel and conveniently removed therefrom, thus doing away with the troublesome and usually rusty chains as used at the present time, which are not only a source of considerable expense but are also exceedingly difficult to apply to and detach from a vehicle wheel.

A further object of my invention is to provide an anti-skidding device which is adapted to engage a spoke of a vehicle wheel and securely hold a flexible member around the tread of the tire, the latter effectually preventing the skidding of the car. A number of anti-skidding devices may be applied to a single wheel, depending on the character of the road the vehicle is to negotiate.

A further object is to provide a device of the above-mentioned character which is so constructed and arranged that it may be economically manufactured, will be capable of application to various sizes of vehicle wheels, and accommodate tires of varying dimensions; further, will be light in weight and will occupy but little room when not in service, and, due to its simple construction and the ready manner in which it may be attached to or detached from the vehicle wheel, may be applied without undue labor or danger of soiling the hands of the operator and requires no special wrenches or other tools for its securement in place.

A further object is to provide an efficient clamping device which will engage a spoke of a vehicle wheel and firmly hold a renewable flexible member about the tread of the tire.

A further object is to provide a new form of anti-skidding member which is in the nature of a flat rope or flexible member, which will thus not in any way interfere with the easy riding qualities of the car but will at the same time effectually prevent the skidding thereof.

With the foregoing and other objects in view, which will appear as the description proceeds, my invention resides in the anti-skidding device for vehicle wheels illustrated in the accompanying drawing and hereinafter described and claimed, and in such variations and modifications thereof as will be obvious to those skilled in the art to which my invention relates.

In the drawing accompanying and forming a part of this specification and wherein the preferred embodiment of my invention is illustrated:

Figure 1 is a view in transverse vertical section of a vehicle wheel having one of my improved anti-skidding devices attached thereto;

Fig. 2 is a view in side elevation of the foregoing;

Fig. 3 is an enlarged view in side elevation of my improved anti-skidding device;

Fig. 4 is a view in section taken on the line 4—4 of Fig. 3; and

Fig. 5 is a view in side elevation of the foregoing.

Referring specifically to the several views, wherein similar reference numerals designate corresponding parts throughout, the vehicle wheel is shown as being composed of the spoke 10, felly 11, rim 12, and attached tire 13. A clamp 14 is secured to the spoke 10 and abuts against the felly 11 and is composed of the pivoted arms 15—16, the same being hingedly secured together by the pin 17. The arms 15—16 are curved so as to embrace and securely engage the spoke 10, suitable rubber pads 18 being provided so as to contact with the spoke and prevent the marring or abrasion thereof.

The arm 15 is provided at its one end with the integral eye 19, while the remote end of the opposite arm 16 is provided with the outstanding bracket 20. The arm 15 is provided adjacent its free end with an auxiliary clamping member 21 which is secured thereto by the pin 22. The auxiliary clamping member, which is adapted to engage the flexible element or rope, as hereinafter described, is substantially elbow-shape and is provided at its free end with the outstanding hook 23 which forms a socket and is adapted to be engaged by a toggle latch 24, The toggle latch is pivotally secured to the outstanding arm 20, as at 25, and is so constructed that it not only tends to draw together the clamping arms 15 and 16 for engagement with the spoke 10, but also tends to draw the auxiliary clamping member 21 toward the extremities of the arms 15—16 and thus securely clamp the flexible element therebetween. To this latter end the free extremities of the arms 15—16 are provided with the outstanding teeth 26, which, in conjunction with the corresponding teeth 26ᵃ formed upon the auxiliary clamp 21, are adapted to bite into and thus securely hold and engage the flexible member.

A flat and relatively thin rope or flexible member 27 is provided and has at its one extremity a tip or abutment member 28 rigidly secured thereto, preferably by the use of rivets 29. The rope or flexible member is of such size as to fit nicely within the eye 19 of the clamp and is prevented from passing completely therethrough by the tip or abutment member 28. The rope extends over the tire 13 and is drawn tightly into engagement therewith and then securely caught and held by the auxiliary clamp 21, which is forced into engagement therewith by the toggle latch, which latter is self-locking, and when snapped into position will so stay until forcibly released. The flat flexible member is made of such size as to be able to accommodate different sizes of tires so that my anti-skidding device may be used with any size of vehicle wheel or tire. Furthermore, the flexible member may be easily removed and replaced after its serviceable life has passed.

Having thus described and explained my invention, I claim and desire to secure by Letters Patent:

1. A device of the class described comprising hinged arms adapted to embrace a vehicle spoke, means for holding said arms in closed position, an eye carried by said arms and coöperating with the aforementioned locking means for securing a flexible element thereto.

2. A clamp for holding a flexible anti-skidding member about a tire, comprising hinged arms, means for engaging one extremity of a flexible member for the securement thereof, and a supplemental clamp including a latch adapted to hold the aforementioned clamping arms in engagement with a vehicle spoke and for securing the free extremity of the flexible member thereto.

3. A clamp for holding a flexible member about a vehicle tire, comprising hinged arms, means carried by said arms for engaging one extremity of a flexible anti-skidding member, an auxiliary elbow-shaped clamp carried by one of said clamping arms, a toggle latch carried at the free extremity of the other of said clamping arms and adapted to engage the said supplemental clamping arm and to draw the main clamping arms into engagement with a spoke of a vehicle wheel and to adjustably and securely engage the free extremity of the said flexible member.

4. A clamp for holding a flexible member about a vehicle tire, comprising hinged arms, means carried by said arms for engaging one extremity of a flexible anti-skidding member, an auxiliary elbow-shaped clamp carried by one of said clamping arms, a self-locking toggle latch carried at the free extremity of the other of said clamping arms and adapted to engage the said supplemental clamping arm and to draw the main clamping arms into engagement with a spoke of a vehicle wheel and to adjustably and securely engage the free extremity of the said flexible member.

5. An anti-skidding device comprising clamping arms hingedly secured together, an eye carried by one of said arm, a supplemental clamp including a self-locking toggle latch carried at the free extremities of said arms, a flat, wide, thin flexible element passing through and retained by said eye, with the remote extremity of said flexible member engageable by said supplemental clamp, the toggle latch being adapted to hold in close position the main clamping arms and the supplemental clamp.

Signed at New York, borough of Manhattan, in the county of New York and State of New York, this 28th day of May, A. D. 1921.

EDWARD N. BREITUNG.

Witnesses:
GEORGE I. GALIPKA,
A. V. WALSH.